United States Patent
Luo et al.

(10) Patent No.: US 7,970,978 B2
(45) Date of Patent: Jun. 28, 2011

(54) SSD WITH SATA AND USB INTERFACES

(75) Inventors: Jianjun Luo, Los Gatos, CA (US); ChuanJen Tsu, Saratoga, CA (US); Minhorng Ko, San Jose, CA (US)

(73) Assignee: Initio Corporation, San Jose, CA (US)

( * ) Notice: Subject to any disclaimer, the term of this patent is extended or adjusted under 35 U.S.C. 154(b) by 133 days.

(21) Appl. No.: 12/468,786

(22) Filed: May 19, 2009

(65) Prior Publication Data

US 2009/0300259 A1 Dec. 3, 2009

Related U.S. Application Data

(60) Provisional application No. 61/056,636, filed on May 28, 2008, provisional application No. 61/056,308, filed on May 27, 2008.

(51) Int. Cl.
*G06F 13/00* (2006.01)
*G06F 12/00* (2006.01)

(52) U.S. Cl. .......................... 710/313; 711/115

(58) Field of Classification Search .................. 710/313; 711/115, 103, 104
See application file for complete search history.

(56) References Cited

U.S. PATENT DOCUMENTS

| | | |
|---|---|---|
| 2006/0161716 A1 | 7/2006 | Lin |
| 2006/0181912 A1 | 8/2006 | Lyer et al. |
| 2007/0061502 A1 | 3/2007 | Lasser et al. |
| 2008/0016269 A1 | 1/2008 | Chow et al. |
| 2008/0112238 A1 | 5/2008 | Kim et al. |
| 2008/0189485 A1 * | 8/2008 | Jung et al. ................ 711/115 |
| 2010/0037001 A1 * | 2/2010 | Langlois et al. ........... 711/103 |

FOREIGN PATENT DOCUMENTS

WO PCT/US2009/045327 7/2009

* cited by examiner

*Primary Examiner* — Glenn A Auve
(74) *Attorney, Agent, or Firm* — Duane Morris LLP (57) ABSTRACT

In one embodiment, a data storage system, includes a controller and a plurality of solid state memory devices each including at least one memory unit. The controller includes a data interface of a first type, a data interface of a second type, and a first serial data bus. Each of the data interfaces of the first and second types is configured to be coupled to a corresponding data interface of a host device. The first serial data bus is coupled to each of the data interfaces of the first and second types and to the plurality of solid state memory devices. The controller is configured to manage data flow between the plurality of solid state memory devices and the host device through the data interfaces of the first and second types.

23 Claims, 9 Drawing Sheets

SSD WITH SATA AND USB INTERFACES

CROSS-REFERENCE TO RELATED APPLICATIONS

This application claims priority to U.S. Provisional Patent Application No. 61/056,308, filed on May 27, 2008, and to U.S. Provisional Patent Application No. 61/056,636, filed on May 28, 2008, which are incorporated by reference herein in their entireties.

FIELD OF DISCLOSURE

The disclosed system and method relate to memory storage devices. More specifically, the disclosed system and method relate to solid-state drives.

BACKGROUND

Solid-state drives (SSD) are a form of data storage that use a solid-state memory to store data. Examples of solid state memory include static random access memory (SRAM), dynamic random access memory (DRAM), and flash memory. SSDs are less susceptible to mechanical failures compared to conventional hard drives because SSDs do not include as many moving parts as conventional disk drives, which store data on a rotating disk. Additionally, SSDs have a faster startup time than conventional hard disk drives because they do not require time for a disk to spin up to a particular speed in order for data to be written to or read from the disk.

An SSD may comprise a plurality of NAND flash memory cells or DRAM memory cells. NAND flash memory may be single-level cell (SLC) flash or multi-level cell (MLC) flash. SLC flash stores a single bit of data per cell, and MLC flash stores store two or more bits of data per cell. Accordingly, MLC flash has a higher density than that of SLC flash, and due to its lower price and higher capacity, MLC flash is more commonly used in an SSD than SLC flash. However, MLC flash has a higher bit error rate (BER) compared to its less complex counterpart SLC flash. Accordingly, SLC flash is more reliable.

Flash memory has a finite number of erase-write cycles. To prolong the life of flash memory, a flash controller performs wear-leveling operations which spread out the read and write operations among the flash groups so that one flash group is not constantly being written to and erased. Additionally, the flash controller coordinates the read, write, and erase cycles as well as perform error correction for the entire group of flash memory. These conventional flash controllers provide slow read and write times and have a limited capacity.

Accordingly, an improved solid-state flash memory architecture is needed.

SUMMARY

In one embodiment, a data storage system, includes a controller and a plurality of solid state memory devices each including at least one memory storage unit. The controller includes a data interface of a first type, a data interface of a second type, and a serial data bus. Each of the data interfaces of the first and second types is configured to be coupled to a corresponding data interface of a host device. The serial data bus is coupled to each of the data interfaces of the first and second types and to each of the plurality of solid state memory devices. The controller is configured to manage data flow between the plurality of solid state memory devices and the host device through the data interfaces of the first and second types.

In some embodiments, an integrated circuit includes a first data port, a second data port, one or more memory ports, a data channel, and a controller. The first data port is configured to be coupled to a serial data channel of a first type, and the second data port is configured to be coupled to a serial data channel of a second type. Each of the one more memory ports is configured to be coupled to a respective memory device. The data channel is coupled to the first and second data ports and to the one or more memory ports. The controller is configured to manage data flow between the one or more memory ports and the first and second data ports.

In some embodiments, a solid state drive (SSD) includes first and second data ports, a multiplexer (mux), a plurality of processors of a first type, and a processor of a second type. The first data port is configured to be coupled to a serial data bus of a first type, and the second data port is configured to be coupled to a serial data bus of a second type. The mux is coupled to the first and second data ports and a data channel. The mux is configured to route data received from the data channel to the first and second data ports. The plurality of processors of the first type are connected to the data channel, and each of the plurality of processors is coupled to a respective group of flash memory. The processor of a second type is coupled to each of the plurality of processors of the first type and to the mux. The processor of the first type is configured to manage data flow from the groups of flash memory to the first and second data ports.

DETAILED DESCRIPTION

Figure 1:
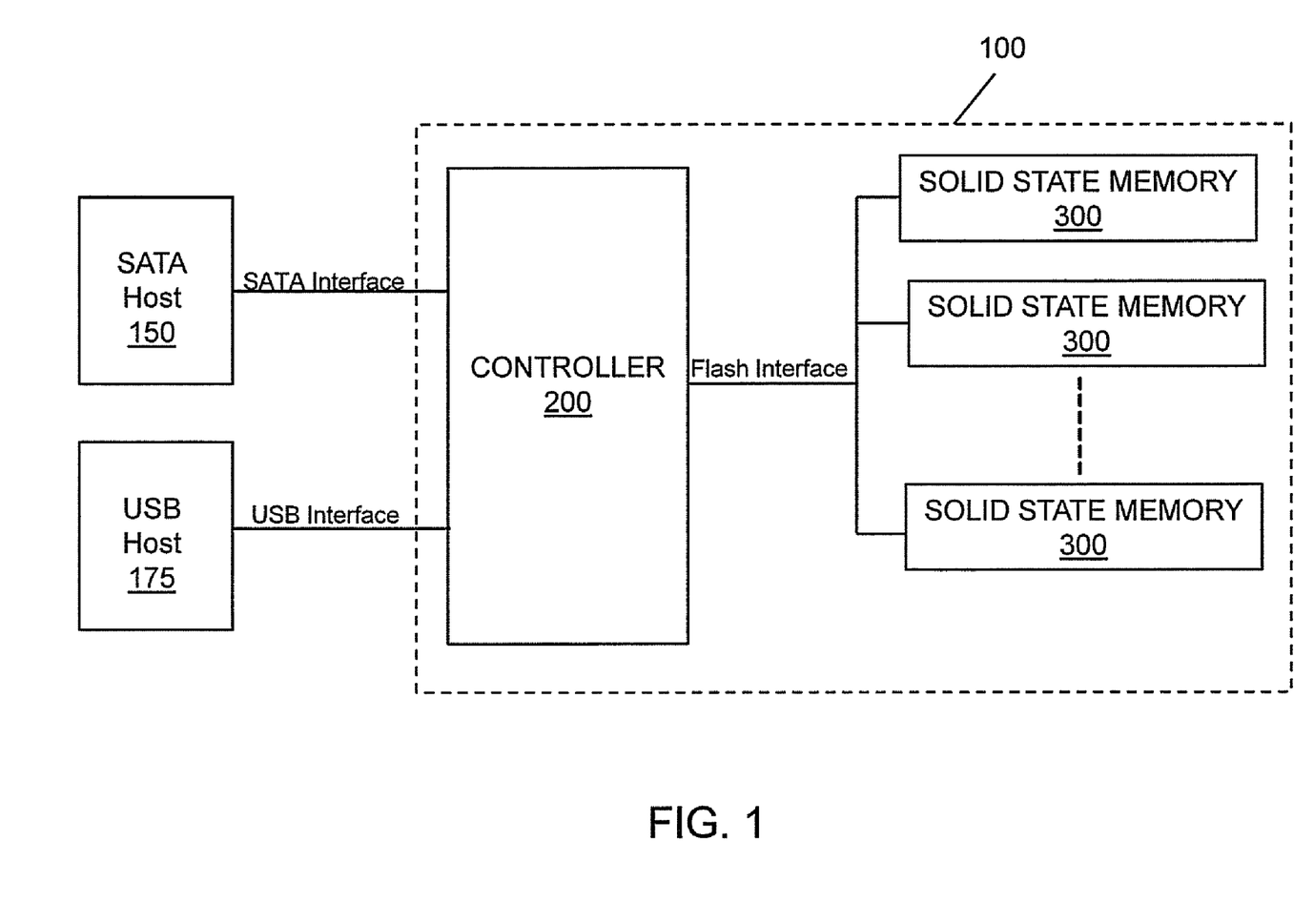
FIG. 1 is a block diagram of a solid-state drive (SSD) in accordance with the present disclosure.

FIG. 1 illustrates one example of a solid-state drive (SSD) 100 connected to a first host 150 through a serial advanced technology attachment (SATA) interface and to a second host 175 through a universal serial bus (USB) interface. Hosts 150 and 175 may be personal computers such as a laptop or desktop, a workstation, a server, or any device having a central processing unit (CPU). Additionally, hosts 150 and 175 may be configured to run any type of operating system including, but not limited to, Microsoft® Windows, Linux, UNIX, Mac OS X, FreeBSD®, or the like. In some embodiments, hosts 150 and 175 are disposed within the same device.

As shown in FIG. 1, SSD 100 includes a controller 200 coupled to one or more solid state memory devices (SSMDs) 300. Controller 200 may be configured to perform management of solid state memory devices 300, which may be a static random access memory (SRAM) devices, dynamic random access memory (DRAM) devices, or flash memory devices. Although the SSMDs are described herein as flash groups, it will be understood that an SSMD may be implemented using SRAM or DRAM. Each group of flash memory may include multi-level flash (MLC) groups and/or single-level flash (SLC) groups as described below.

Figure 2A:
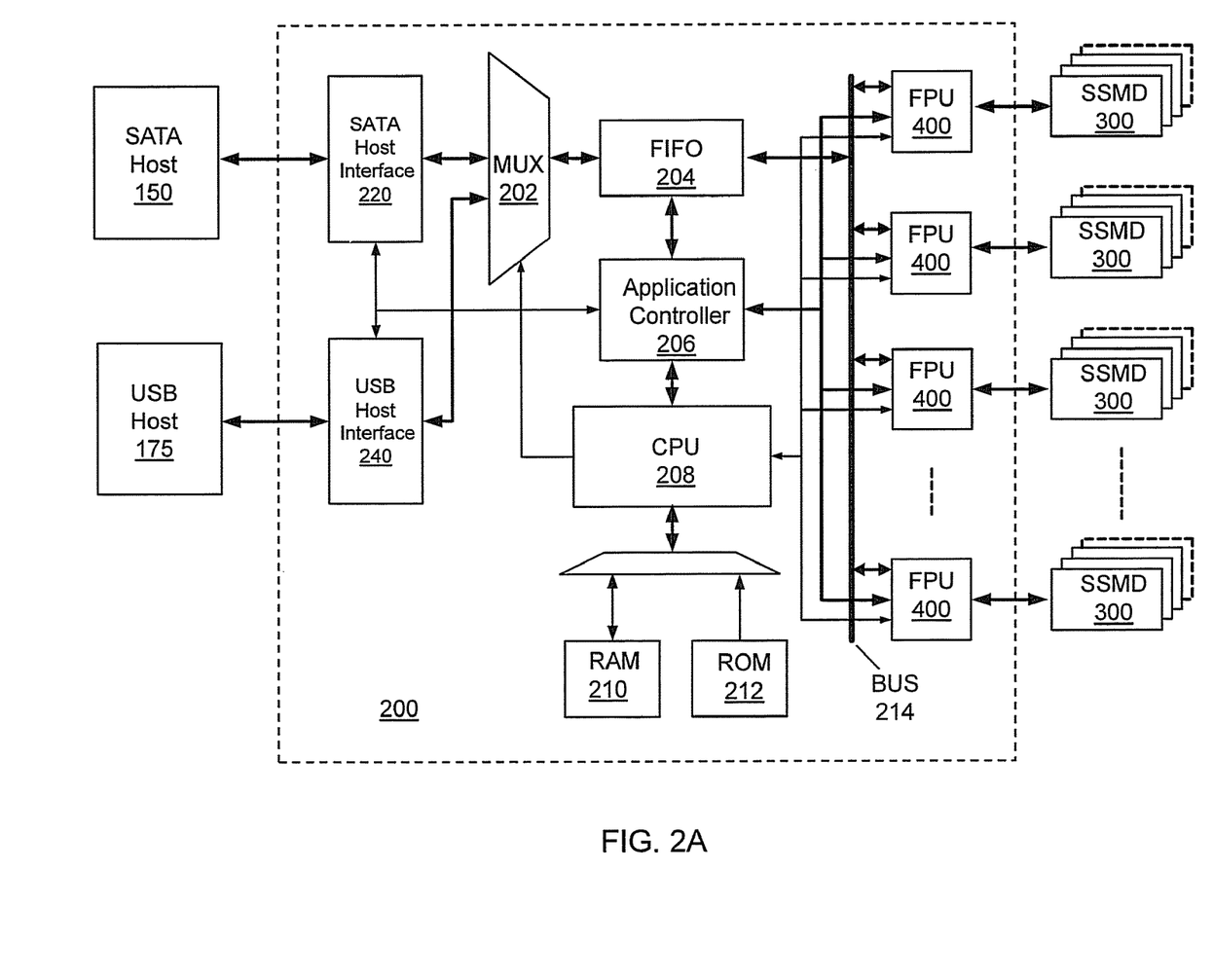
FIG. 2A is a block diagram of one example of a controller in accordance with the SSD illustrated in FIG. 1.

FIG. 2A is a block diagram of one example of a controller 200 connected. In some embodiments, controller 200 may be disposed on a single integrated circuit chip. As shown in FIG. 2A, controller 200 includes a SATA interface 220, a USB interface 240, a multiplexer (mux) 202, a first-in first-out register (FIFO) 204, an application controller 206, a central processing unit (CPU) 208, a random access memory (RAM) 210, a read only memory (ROM) 212, and one or more flash processing units (FPUs) 400. Hosts 150, 175 may be connected to mux 202 through the SATA interface 220 and the USB interface 240, respectively. Mux 202 may be in data communication with FIFO 204 and CPU 208. FIFO 204 is connected to application controller 206 and to each of the flash groups 300 through a self-defined bus 214. FIFO 204 is also coupled to each flash group 300 through an FPU 400.

In some embodiments, the SATA interface 220 may have a data transfer rate of 6.0 Gb/s, and the USB interface 240 may have a data transfer rate of 4.8 Gb/s. However, one skilled in the art will understand that both the SATA interface 220 and USB interface 240 may be implemented having higher or lower data transfer rates. Additionally, although SATA and USB interfaces 220, 240 are described, other serial data buses may be implemented. In embodiments where the controller 200 is implemented on a single integrated circuit chip, SATA and USB interfaces 220, 240 may be ports or I/O pads for respective connection to SATA and USB channels disposed on a printed circuit board as will be understood.

CPU 208 may be a processor, microprocessor, microcontroller, or like device. As shown in FIG. 2A, CPU 208 may be connected to mux 202, application controller 206, and each of the FPUs 400. In some embodiments, CPU 208 may be a 32-bit processor, although one skilled in the art will understand that processors having other computing powers may be implemented.

RAM 210 may be any type of random access memory such as, for example, SRAM or DRAM. ROM 212 may be any type of read only memory including, but not limited to, programmable read only memory (PROM), erasable programmable read only memory (EPROM), or electrically erasable programmable read only memory (EEPROM). Each FPU 400 is connected to a respective flash group 300, which may include one or more flash units 302. In some embodiments, each flash group 300 may include multiple flash channels per group.

Figure 2B:
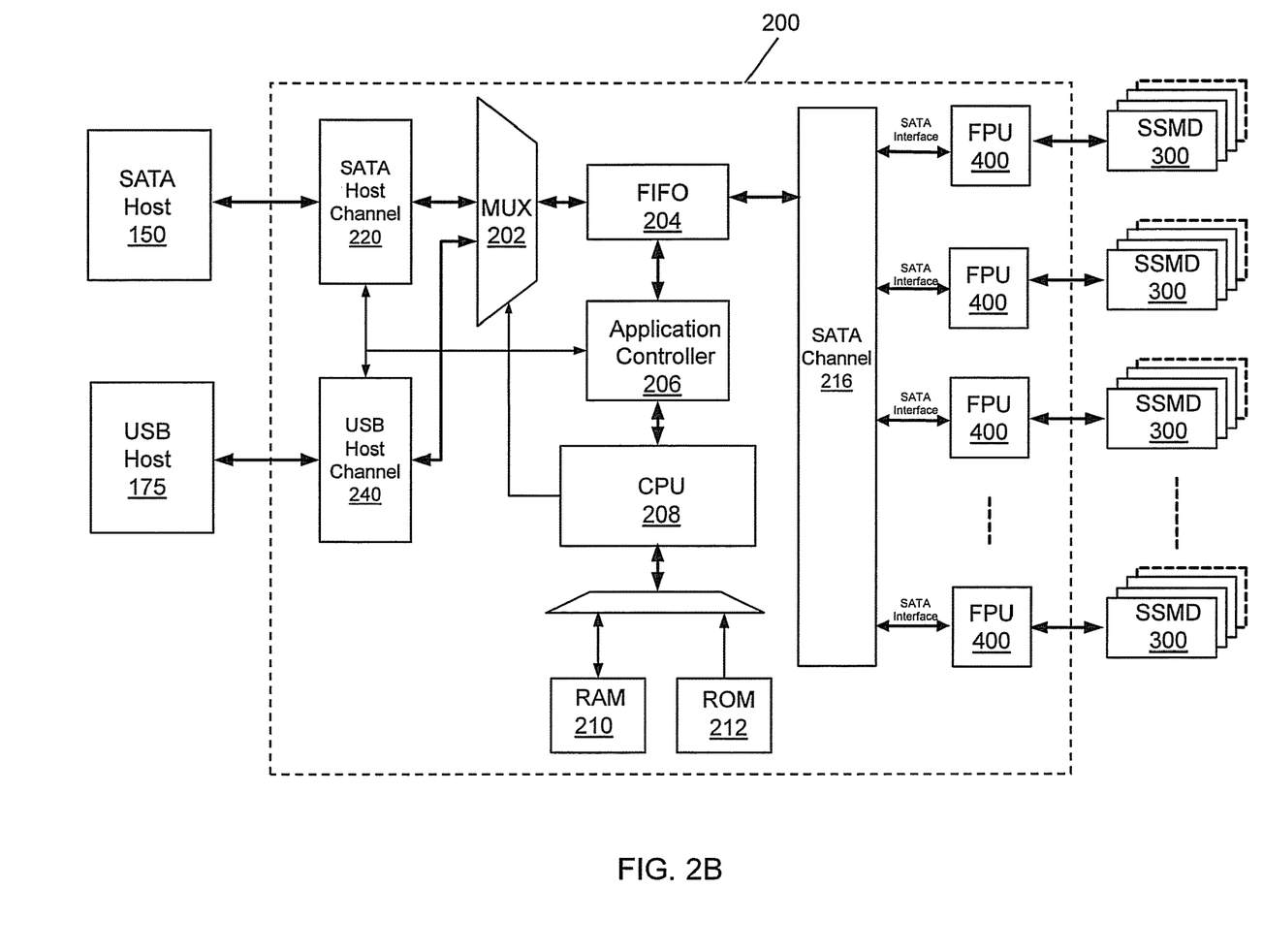
FIG. 2B is a block diagram of another example of a controller in accordance with the SSD illustrated in FIG. 1.

FIG. 2B is another example of a controller 200. The controller 200 illustrated in FIG. 2B includes each of the components described above with respect to FIG. 2A except that the application controller 206 and CPU 208 are connected to FPUs 400 through the FIFO 204 and a SATA channel 216 instead of through the self-defined bus 214. The description of the common components is not repeated.

Application controller 206 is configured to manage the transmission of data between host 150 and the flash groups 300. For example, when data are being transferred from the host 150 to the flash groups 300, the application controller 206 may distribute data to one or more flash groups 300. When data are being transferred from flash blocks 300 to host 150, application controller 206 may organize data from different flash blocks 300 into a single block of data, which is then transferred to mux 202 for distribution to either the SATA or USB hosts 150, 175.

Figure 3:
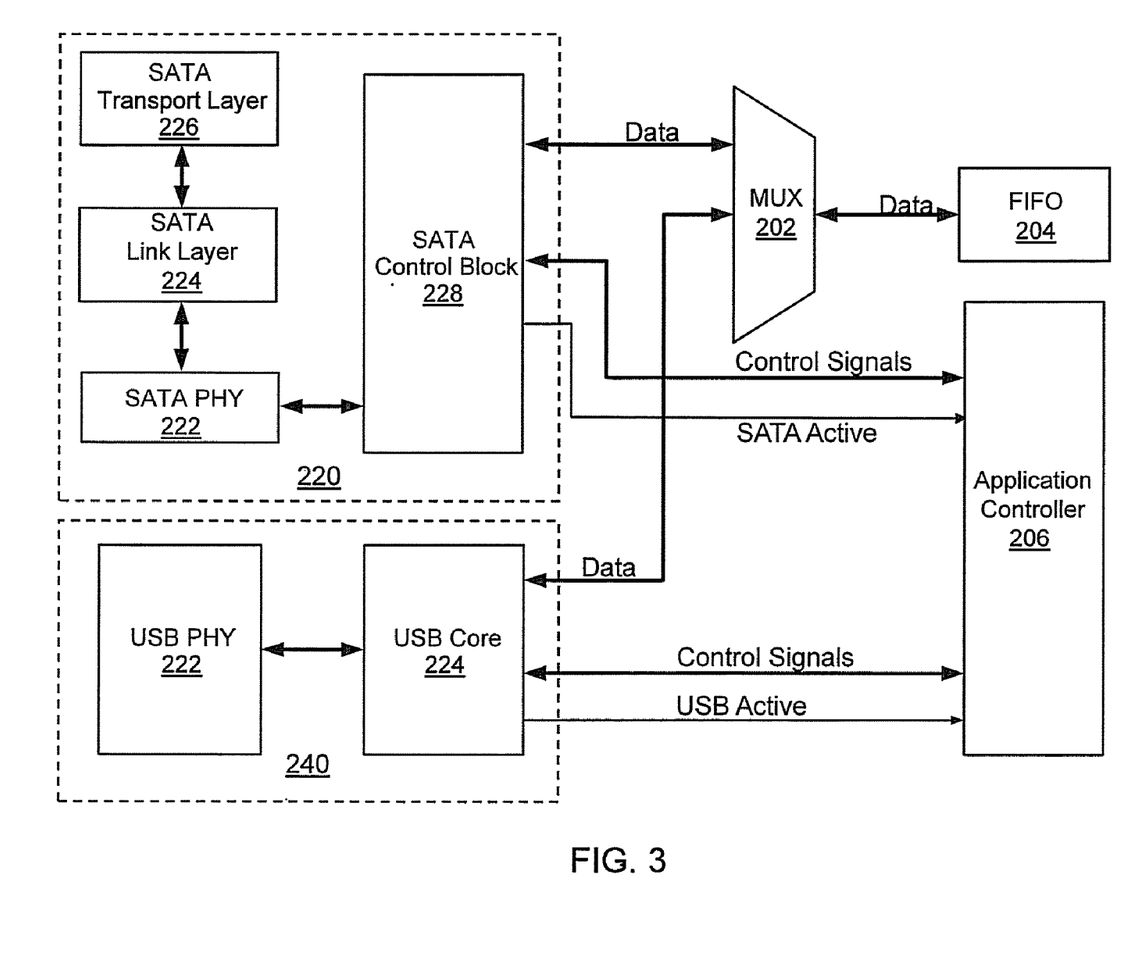
FIG. 3 is a block diagram illustrating one example of the interconnection between a SATA host channel, a USB host channel, a multiplexer, a first-in first-out register (FIFO), and an application controller in accordance with the embodiment shown in FIG. 1.

FIG. 3 is a block diagram illustrating one example of the interconnection between SATA interface 220, USB interface 240, mux 202, FIFO 204, and application controller 206. As shown in FIG. 3, SATA interface 220 includes a SATA physical layer (PHY) 222, a SATA link layer 224, a SATA transport layer 226, and a SATA control block 228. SATA PHY 222 is connected to SATA link layer 224 and is configured to encode and decode SATA data to the SATA link layer 224. SATA link layer 224 is configured to transmit and receive data packets or frames. SATA link layer 224 is further configured to receive primitives from, and transmit primitives to, the SATA PHY 222 based on control signals it receives from the SATA transport layer 226. SATA transport layer 226 is responsible for delivering data to the appropriate application process. The SATA control block 228 is configured to manage the data flow and control signals for the SATA interface 220 by communicating control signals to application controller 206 and transmitting and receiving data to and from mux 202.

USB interface 240 includes a USB PHY 242 and a USB core 244. USB PHY 242 is connected to USB core 244 and is configured to encode and decode USB data. USB core 244 manages USB data flow and USB control signals for the USB interface 240 by communicating control signals to application controller 206 and transmitting and receiving data to and from mux 202. Application controller 206 may perform the role of an arbiter to determine whether data is being transmitted by the SATA interface 220 or the USB interface 240.

Figure 4:
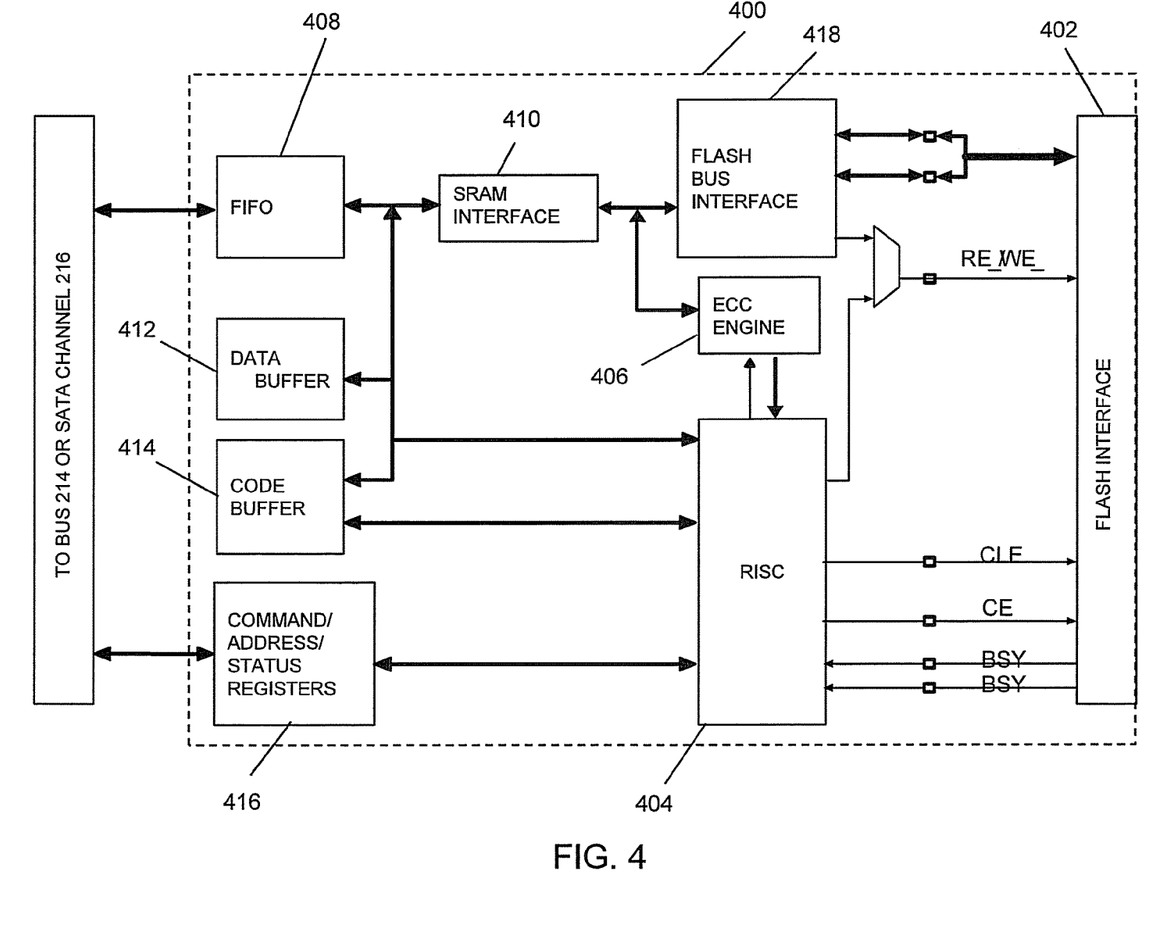
FIG. 4 is a block diagram of one example of an architecture of a flash processing unit (FPU) in accordance with the controllers illustrated in FIGS. 2A and 2B.

FIG. 4 is a block diagram illustrating one example of the structural and functional components of an FPU 400. As shown in FIG. 4, an FPU 400 may include a First-In-First-Out (FIFO) register 408 that may be connected to the SATA channel 216 or to bus 214, an SRAM interface 410, a data buffer 412, a code buffer 414, and the RISC 404. Command/address/status registers 416 may also be connected to RISC 404 and to SATA channel 216 or bus 214. SRAM interface 410 may be connected to a flash bus interface 418 and an error correction code (ECC) engine 406. ECC engine 406 may be connected to RISC 404. Flash bus interface 418 and RISC 404 may be connected to the flash interface 402.

In some embodiments, FIFO 408 may be 2K by 32-bit data FIFO implemented using SRAM. Data buffer 412 and code buffer 414 may also be implemented using SRAM, although it is understood that FIFO 408, data buffer 412, and code buffer 414 may be implemented using other memory types or registers. FIFO 408, data buffer 412, and code buffer 414 are configured to receive and buffer the data received from, or being transmitted to, SATA channel 216 or bus 214 via SRAM interface 410 and flash bus interface 418.

ECC engine 406 may be configured to execute an error correction code to perform error correction on data being written to or read from a flash group 300 in conjunction with RISC 404. For example, the ECC may be a Hamming code, a Reed-Solomon code, or like code that may be used to determine and correct data errors. RISC 404 may be configured to perform wear-leveling, bad block management, and other operations conventionally performed by a single flash controller. For example, a table may be stored in the flash groups 300 identifying the location of one or more bad blocks of data. These bad blocks may be the result of over-use and will be skipped when a data read/write is executed.

Each FPU 400 may include its own firmware, which may be different from the firmware of other FPUs 400 advantageously enabling each FPU 400 to perform different operations as well as enabling different types of flash blocks 300 to be connected to controller 200. For example, a first flash group including a plurality of SLC flash units may be connected to a first FPU, and a second flash group including a plurality of MLC flash units may be connected to a second FPU. The first and second FPUs may each be configured with distinct firmware that enables the first FPU to perform error correction, bad block management, or other functions typically performed by a single flash processor on MLC flash units and the second FPU to perform error correction, bad block management, or other management operations on the SLC flash with each of the first and second FPUs being managed by the same CPU 208. Accordingly, the distributed architecture of controller 200 advantageously enables an SSD to be implemented having a blend of reliability and performance while at the same time reducing the amount of processing performed by the supervisor CPU 208. Additionally, the distributed architecture reduces the amount of processing performed by each processor, increasing the performance of the SSD.

Figure 5A:
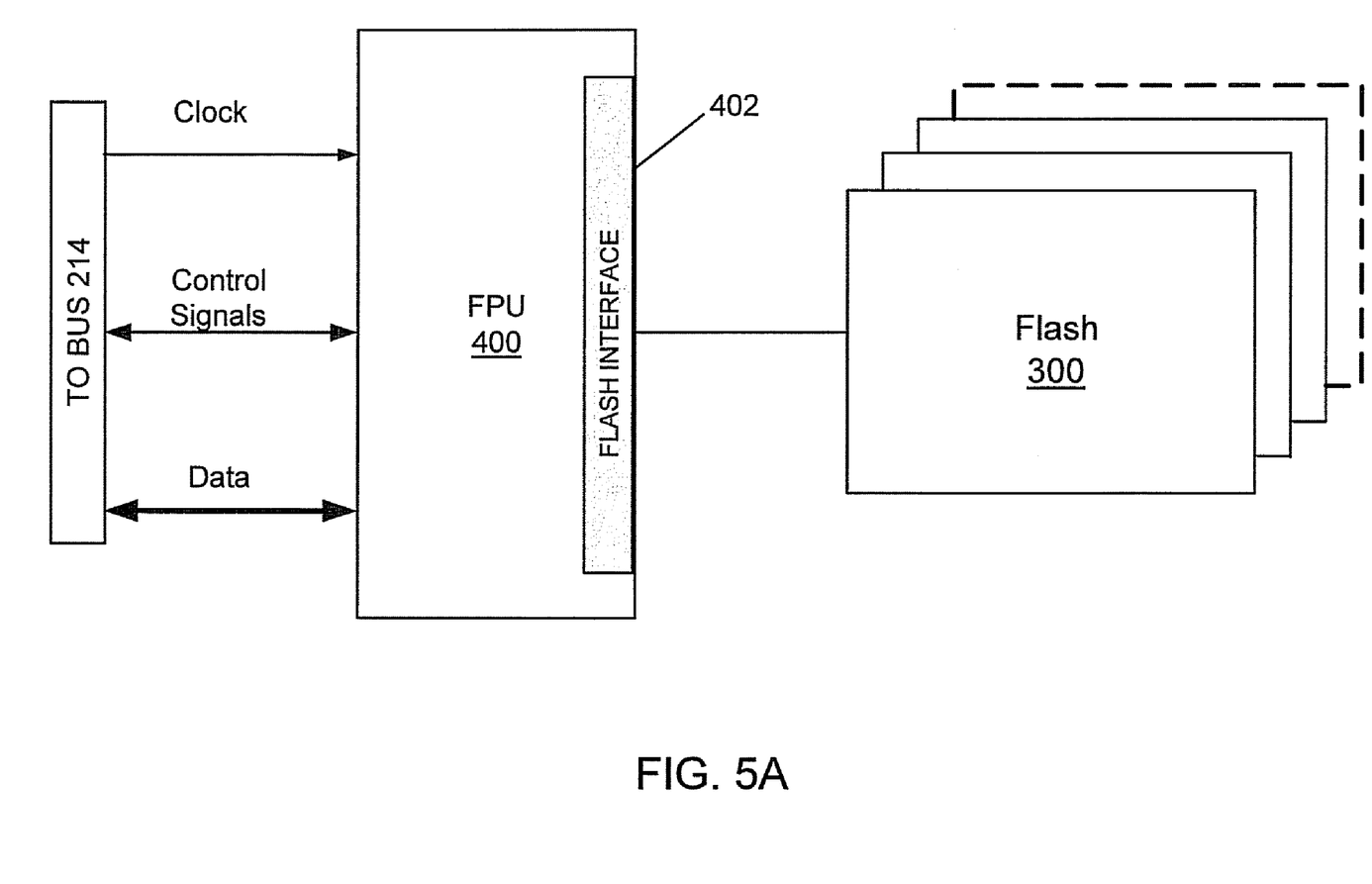
FIG. 5A illustrates one example of a connection between a flash controller and a flash group in accordance with the embodiment shown in FIG. 1.
Figure 5B:
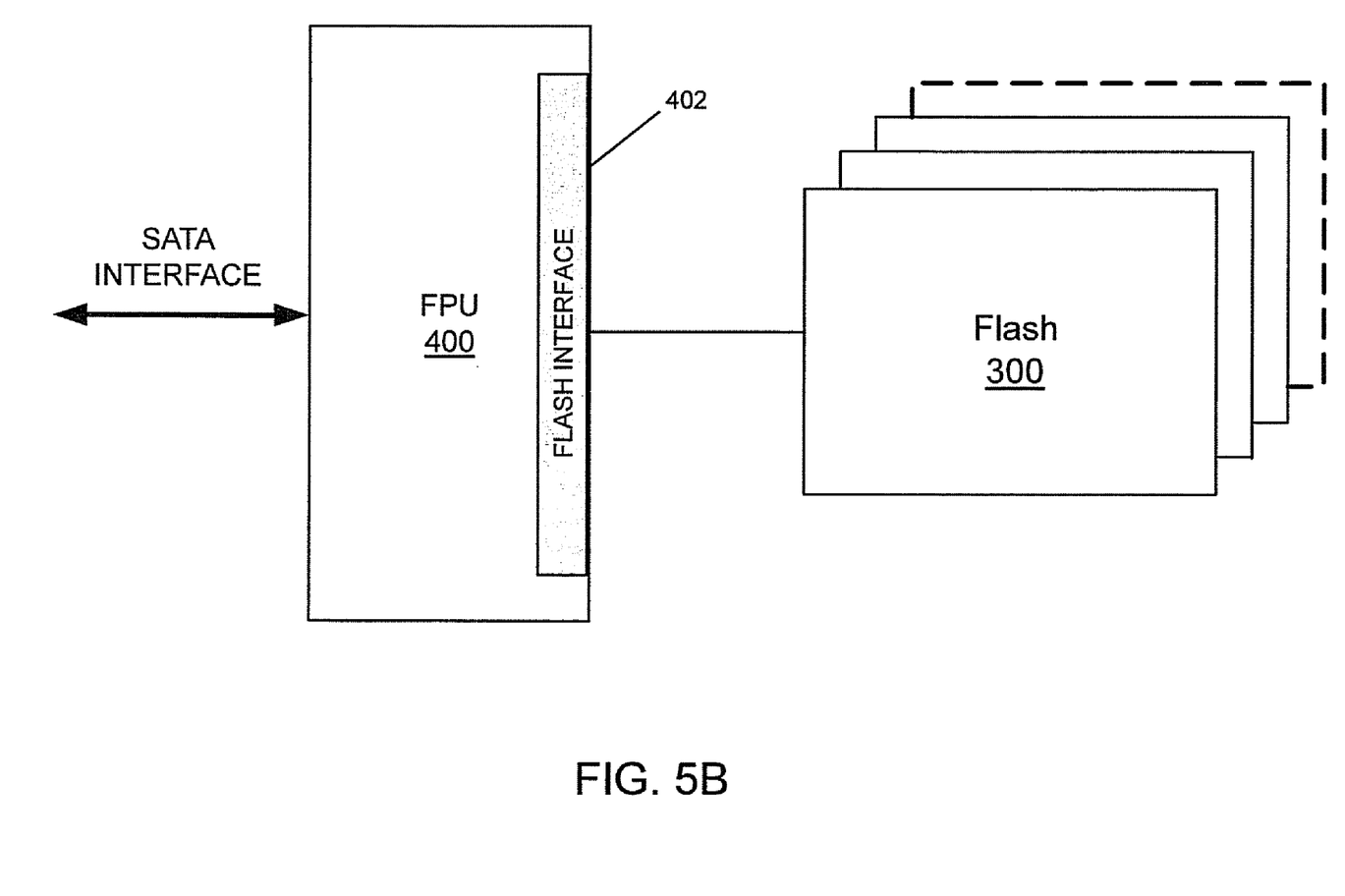
FIG. 5B illustrates another example of a connection between a SATA flash controller and a flash group in accordance with the embodiment shown in FIG. 1.

FIG. 5A illustrates one example of a connection between an FPU 400 and a flash group 300. As shown in FIG. 5A, FPU 400 receives a clock signal, control signals, and data from the bus 214. In another embodiment illustrated in FIG. 5B, the FPU 400 is a SATA FPU including a flash interface 402 and a SATA interface for connection to the SATA channel 216 as illustrated in FIG. 2B. Additionally, an FPU 400 may be configured to perform interleaving operations enabling a flash group 300 to include a plurality of flash channels 304.

Figure 6A:
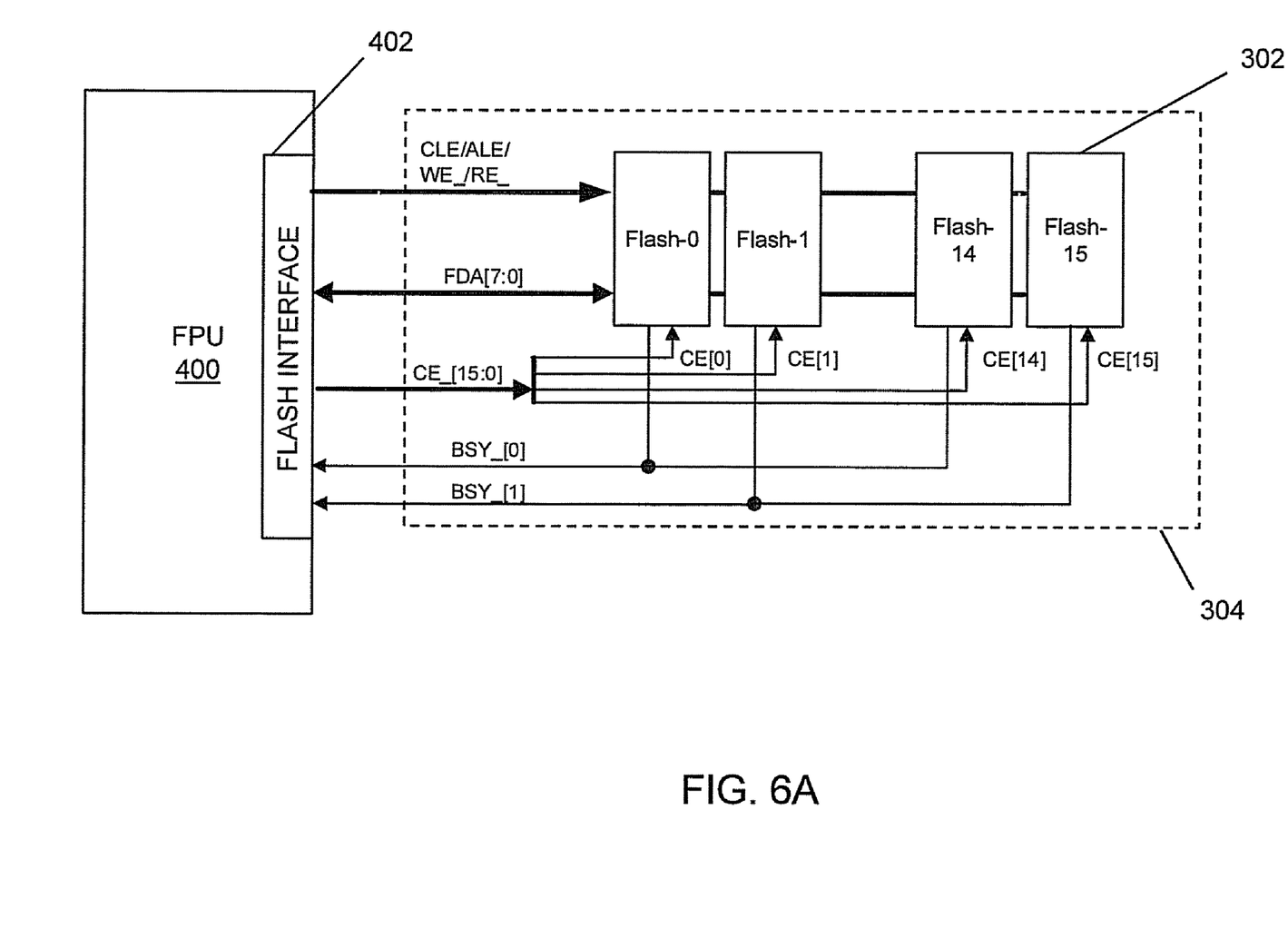
FIG. 6A illustrates one example of a connection between a flash interface and a flash group in accordance with the embodiment shown in FIG. 1

FIG. 6A illustrates one example of a connection between a flash interface 402 and a flash group 300. As shown in FIG. 6A, flash group 300 includes one or more flash units 302 connected in series to form a flash channel 304. One skilled in the art will appreciate that flash units 302 may also be connected in parallel. Flash units 302 receive control signals via control lines connected to flash interface 402. Examples of control signals include, but are not limited to, command latch enable (CLE), read (RE), write (WE), chip enable (CE), and busy (BSY) signals. In one embodiment, the BSY signals of the odd numbered flash units 302 are connected to line BSY_[0], and the BSY signals of the even numbered flash units 302 are connected to line BSY_[1]. Each flash unit 302 may be connected to its own CE signal line whereas the remainder of the control signals and an 8-bit data bus may be shared by each of the flash units 302.

Figure 6B:
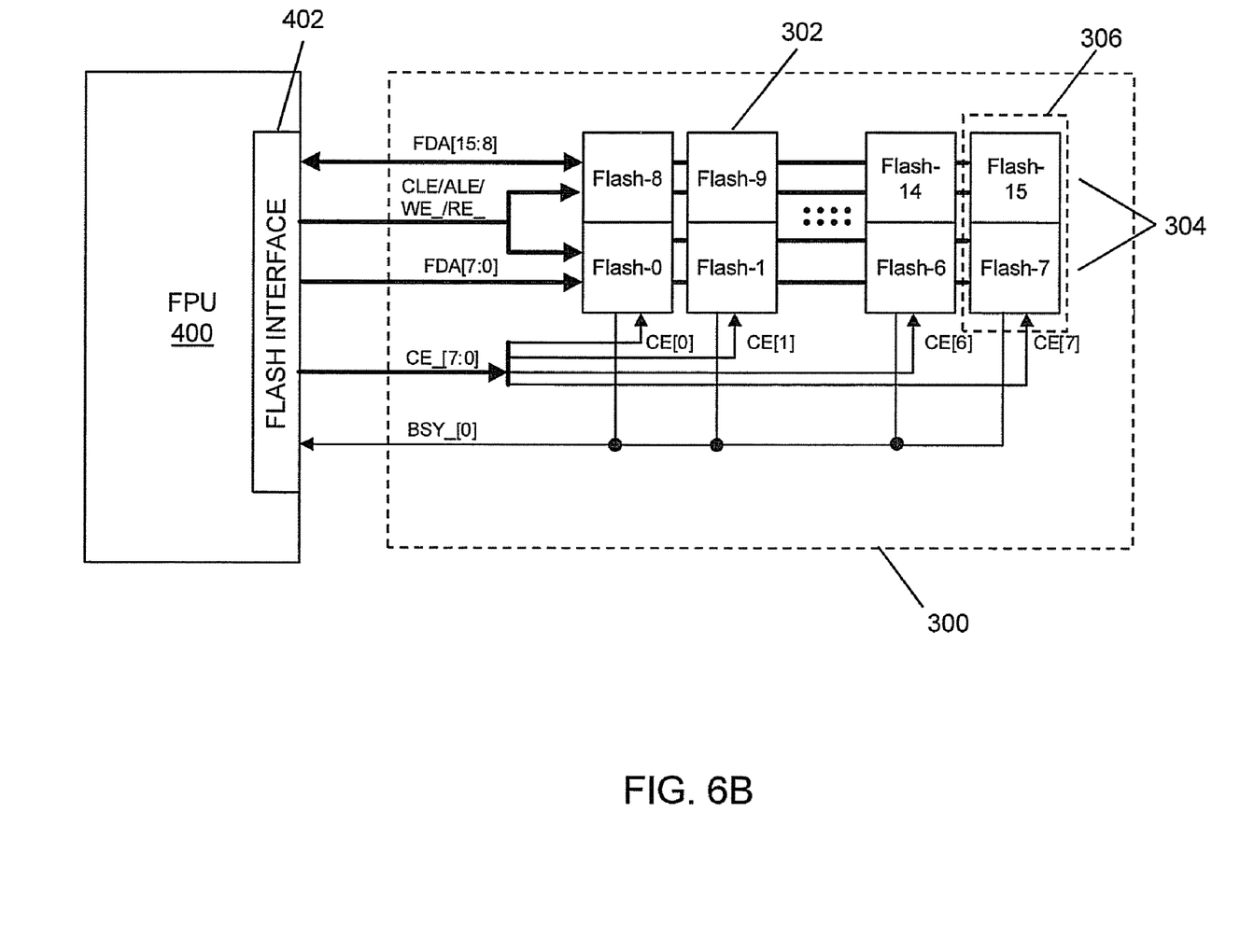
FIG. 6B illustrates another example of a connection between a flash interface and a flash group in accordance with the embodiment shown in FIG. 1.

FIG. 6B illustrates one example of a connection between a flash interface 402 and a flash group 300 having two flash channels 304. As shown in FIG. 6B, flash group 300 includes a plurality of flash units 302. Flash units 302 may be connected to another flash unit 302 to form a flash sub-group 306. For example, flash units 7 and 15 may be connected to each other to form a flash sub-group 306. One skilled in the art will appreciate that fewer or more flash units 302 may be grouped together to form a flash sub-group 306. Each flash sub-group 306 may have a chip enable signal (CE) and all of the flash units 302 may be connected to the same flash control signal lines including, but not limited to, the command latch enable (CLE), read (RE), and write (WE) signal lines.

Referring now to FIGS. 1-6, the operation of SSD 100 is now described. When the host 150 and/or host 175 are powered up, ROM 212 may load stored firmware into RAM 210 so that CPU 208 may readily access the instructions. The CPU 208 in controller 200 executes the firmware instructions and sends instructions to application controller 206, which manages the data flow of SSD by coordinating if data is to be transmitted via SATA interface 220 or USB interface 240.

If data is transmitted via SATA interface 220, then the mux 202 connects the SATA interface to FIFO 204, which acts as a data buffer for the SATA interface 220 and the FPU 400. In the embodiment shown in FIG. 2A, FPUs 400 communicate with FIFO 204 and the application controller 206 through bus 214. Alternatively, in the embodiment shown in FIG. 2B, the FPUs 400 communicate with FIFO 204 through SATA channel 216. The SATA control block 228 manages the communication between the SATA interface 220 and the application controller 206. For example, SATA control block 228 receives commands from application controller 206 that it interprets and sends to SATA link layer 224 through SATA PHY 222 for managing the data flow through SATA interface 220.

If data is transmitted via USB interface 240, then the mux 202 connects the USB interface 240 to FIFO 204. FIFO 204 acts as a data buffer for the USB interface 240 and the FPUs 400. In the embodiment shown in FIG. 2A, FPUs 400 communicate with FIFO 204 and the application controller 206 through bus 214. Alternatively, in the embodiment shown in FIG. 2B, FPUs 400 communicate with FIFO 204 through SATA channel 216. The USB core 244 manages the communication between the USB interface 240 and the application controller 206. For example, USB core 244 receives commands from application controller 206 that it interprets and sends to USB PHY 242. In this manner, USB core 244 manages the data through the USB interface 240.

The controller 200 as described herein advantageously enables higher performance of a SSD to be achieved while providing the flexibility of multiple data transfer interfaces. In some embodiments, controller 200 enables read speeds in excess of 200 MB/s and write speeds in excess of 100 MB/s to be achieved while enabling SATA data transfer rates of 1.5 Gb/s, 3.0 Gb/s, or 6.0 Gb/s and USB data transfer rates of up to 4.8 Gb/s. Additionally, the distributed architecture enables both SLC and MLC flash to be implemented to provide flexibility in the type of flash memory implemented as the SSD and to enable a trade-off between performance and reliability.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A data storage system, comprising:
   a plurality of solid state memory devices each including at least one memory unit; and
   a controller coupled to the plurality of solid state memory devices, the controller including:
   a data interface of a first type and a data interface of a second type, each of the data interfaces of the first and second types configured to be coupled to a corresponding data interface of a host device,
   a first serial data bus coupled to each of the data interfaces of the first and second types and to each of the plurality of the solid state memory devices,
   a plurality of processors of a first type, each of the plurality of processors of the first type coupled to a respective solid state memory device, and
   a processor of a second type configured to manage access to the first serial data bus by the plurality of processors of the first type, the controller configured to manage data flow between the plurality of solid state memory devices and the host device through the data interfaces of the first and second types.

2. The data storage system of claim 1, wherein the controller includes a multiplexer configured to combine data received from the data interfaces of the first and second types and provide the combined data to the first serial data bus.

3. The data storage system of claim 2, wherein the multiplexer is configured to distribute data received from the plurality of solid state memory devices between the data interfaces of the first and second types.

4. The data storage system of claim 1, wherein the data interface of the first type is a serial advanced technology attachment (SATA) interface, and the data interface of the second type is a universal serial bus (USB) interface.

5. The data storage system of claim 1, wherein the first serial data bus is a serial advanced technology attachment (SATA) channel.

6. The data storage system of claim 1, wherein the first serial data bus is a universal serial bus (USB) channel.

7. The data storage system of claim 1, wherein each of the plurality of processors of the first type are configured to perform wear-leveling for the solid state memory device to which it is coupled.

8. An integrated circuit chip, comprising:
a first data port disposed on the integrated circuit chip and configured to be coupled to a serial data channel of a first type;
a second data port disposed on the integrated circuit chip and configured to be coupled to a serial data channel of a second type;
a plurality of memory ports disposed on the integrated circuit chip, each of the plurality memory ports configured to be coupled to a respective memory device;
a data channel disposed on the integrated circuit chip and coupled to the first and second data ports and to the one or more memory ports; and
a controller disposed on the integrated circuit chip and configured to manage data flow between the one or more memory ports and the first and second data ports, the controller including
a number of processors of a first type equal to a number of the memory ports, each of the processors of the first type associated with a respective one of the plurality of memory ports, and
a processor of a second type for managing access to the data channel by each of the processors of the first type.

9. The integrated circuit of claim 8, wherein the serial data bus of the first type is a serial advanced technology attachment (SATA) channel.

10. The integrated circuit of claim 9, wherein the serial data channel of the second type is a universal serial bus (USB) channel.

11. The integrated circuit of claim 8, wherein the data channel includes a first-in first-out register (FIFO).

12. The integrated circuit of claim 8, wherein the data channel is a serial advanced technology attachment (SATA) channel.

13. The integrated circuit of claim 8, wherein each of the processors of the first type are configured to execute an error correction code on data being transferred to a respective memory port.

14. The integrated circuit of claim 8, wherein the controller includes:
a multiplexer (mux) disposed between the data channel and the first and second data ports, the mux configured to combine data received from the first and second data ports and transmit it to the data channel.

15. The integrated circuit of claim 14, wherein the multiplexer is configured to receive data from the data channel and distribute it to the first and second data ports.

16. A solid state drive (SSD), comprising:
a first data port configured to be coupled to a serial data bus of a first type;
a second data port configured to be coupled to a serial data bus of a second type;
a multiplexer (mux) coupled to the first and second data ports and a data channel, the mux configured to route data received from the data channel to the first and second data ports;
a plurality of processors of a first type coupled to the data channel, each of the plurality of processors configured to be coupled to a respective group of flash memory; and
a processor of a second type coupled to each of the plurality of processors of the first type and to the mux, the processor of the second type configured to manage data flow from the groups of flash memory to the first and second data ports.

17. The SSD of claim 16, wherein the serial data port of the first type is a serial advanced technology attachment (SATA) channel, and the serial data port of the second type is a universal serial bus (USB) channel.

18. The SSD of claim 16, wherein each of the plurality of processors of the first type are configured to perform wear-leveling operations for its respective group of flash memory.

19. The SSD of claim 16, wherein each of the plurality of processors of the first type are configured to execute an error correction coding on data being transferred from its respective group of flash memory.

20. The SSD of claim 16, wherein at least one of the groups of flash memory includes single-level cell flash.

21. The SSD of claim 20, wherein at least one of the groups of flash memory includes multi-level cell flash.

22. The SSD of claim 16, wherein at least one of the groups of flash memory includes multi-level cell flash.

23. The SSD of claim 16, wherein at least one of the groups of flash memory includes a combination of multi-level cell (MLC) flash and single-level cell (SLC) flash.

* * * * *